June 20, 1961

W. N. MERRICK 2,989,180

SHRIMP SORTER

Filed July 19, 1957

3 Sheets-Sheet 1

INVENTOR.
WALLACE N. MERRICK,
BY Linton and Linton
ATTORNEYS.

June 20, 1961  W. N. MERRICK  2,989,180
SHRIMP SORTER

Filed July 19, 1957  3 Sheets-Sheet 2

INVENTOR.
WALLACE N. MERRICK,
BY
*Linton and Linton*
ATTORNEYS.

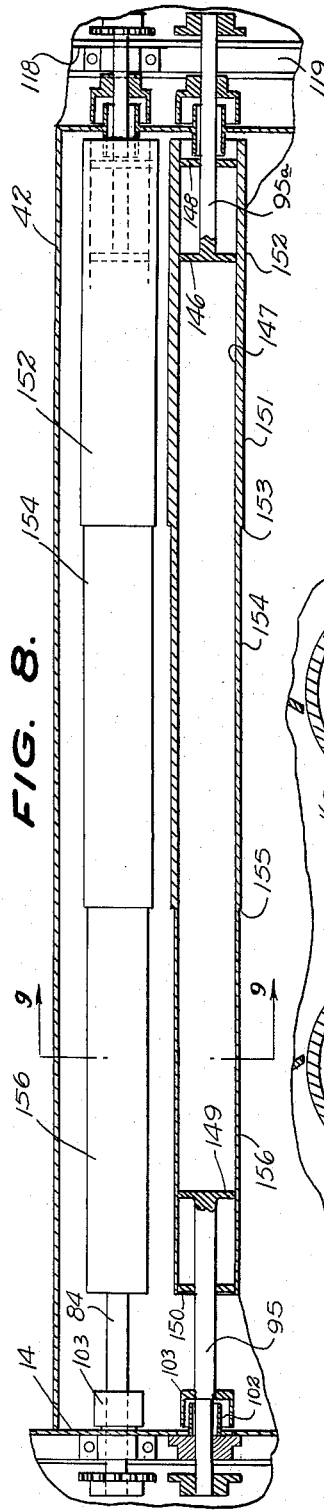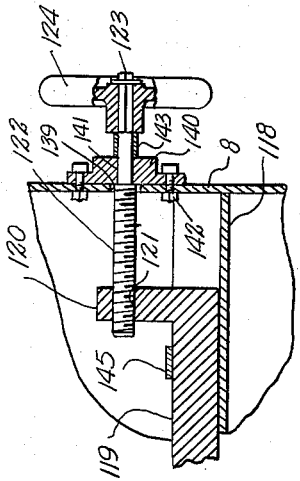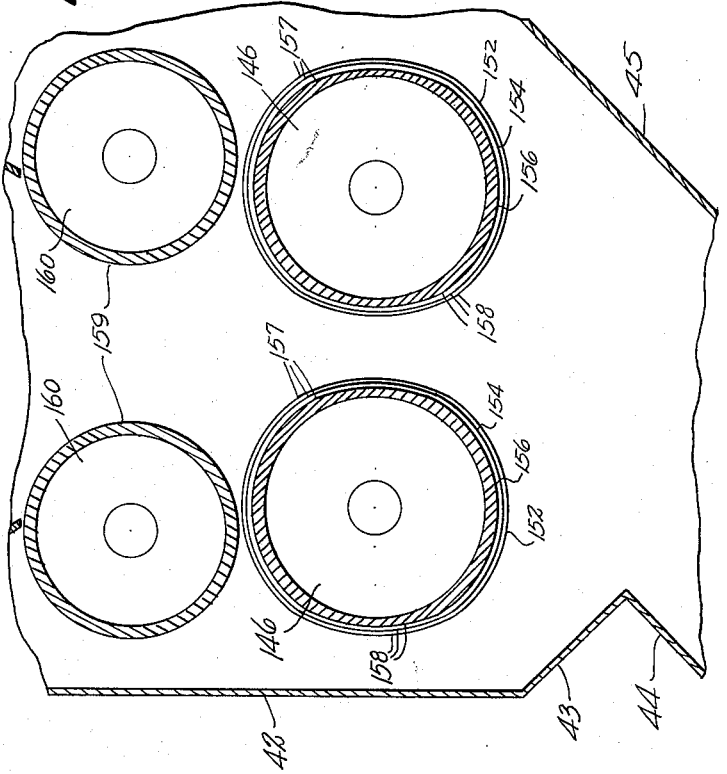

United States Patent Office 2,989,180
Patented June 20, 1961

2,989,180
SHRIMP SORTER
Wallace N. Merrick, 825 W. Jefferson, Harlingen, Tex.
Filed July 19, 1957, Ser. No. 673,022
2 Claims. (Cl. 209—107)

The present invention relates to sorting and grading apparatus and is more particularly directed to a machine for automatically separating and distributing articles to predetermined standards from mixed groups thereof.

It is the principal object of the invention to provide a sorter or grader for edible articles, such as shrimp and the like, for example, capable of receiving a plurality of articles of various sizes and to automatically progressively separate the articles of each predetermined size or grade from the remainder and separately distribute the articles of related sizes.

A further and important object of the invention is to provide a power driven machine for separating large volumes of mixed articles, suitable for commercial operations and which machine is adjustable at all times, even during operation thereof, for changing the size or grade selection of articles while maintaining a long and useful life even under continuous operation.

Another and equally important object of the invention is to provide a machine for continuously receiving shrimp and the like of a multitude of sizes and in various positions and separating the shrimp according to a plurality of size groups and distributing the shrimp of each size separately from those of other sizes in order that they may be processed and/or packaged ready for the market with shrimp of the same size in each package improving the salability and value thereof.

Figure 1:
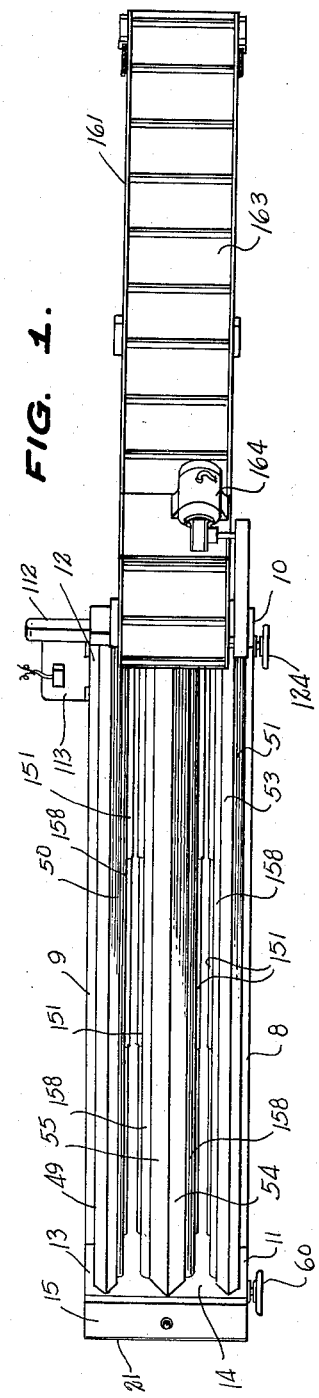
Figure 2:
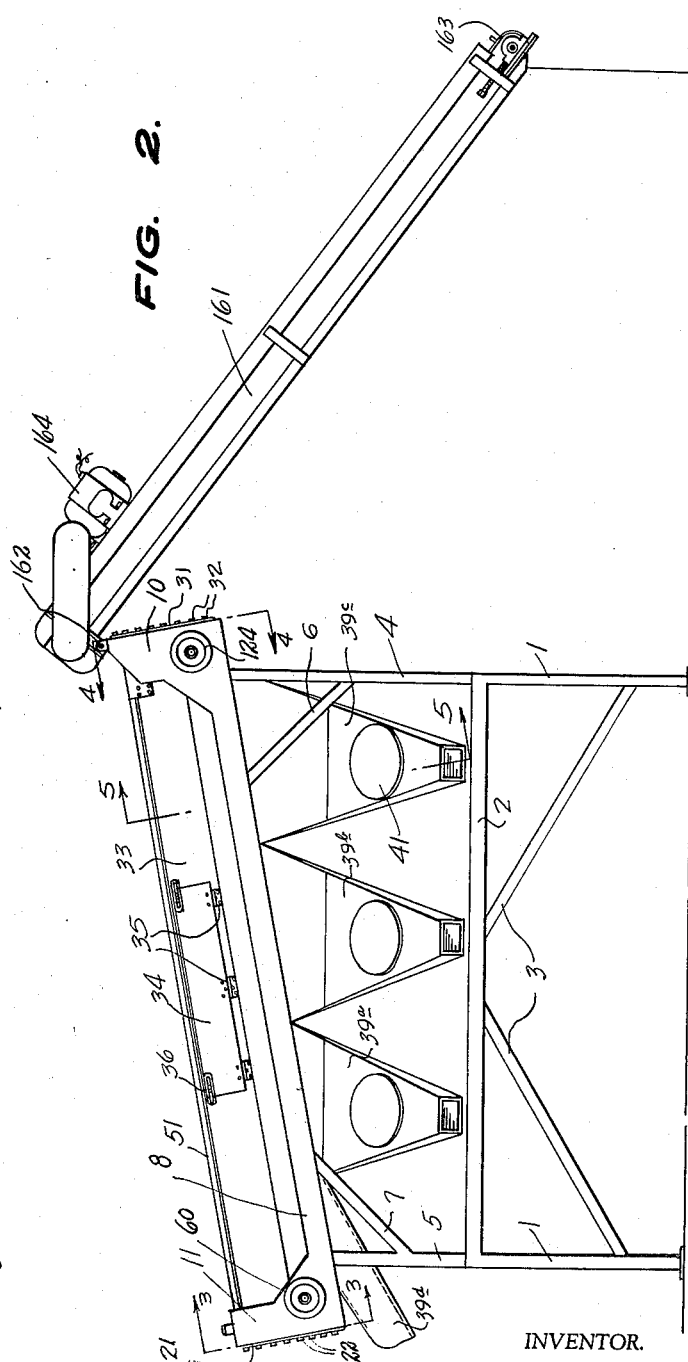
Figure 3:
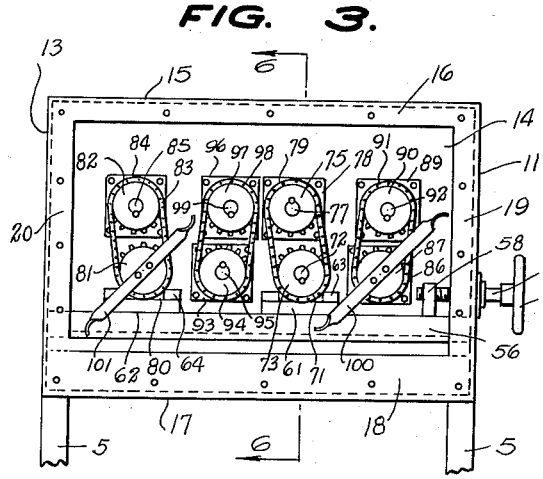
Figure 6:
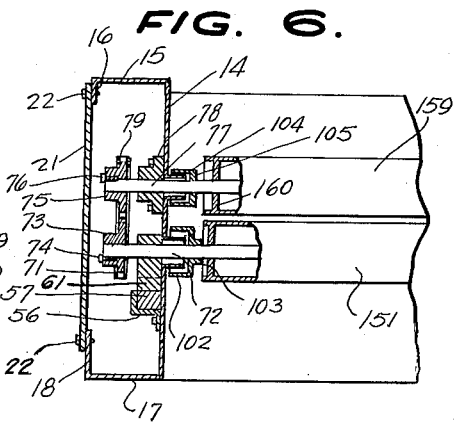
Figure 4:
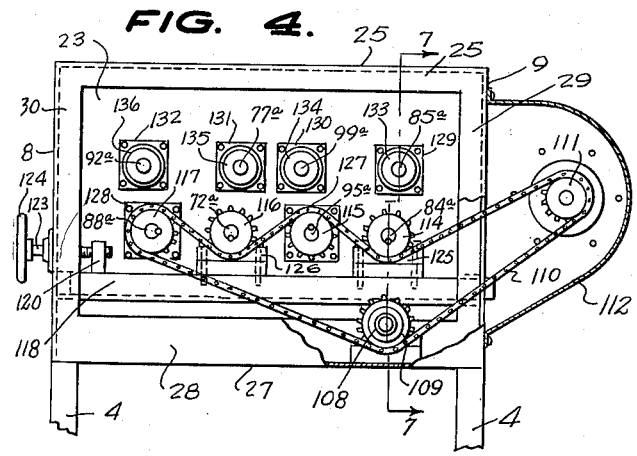
Figure 7:
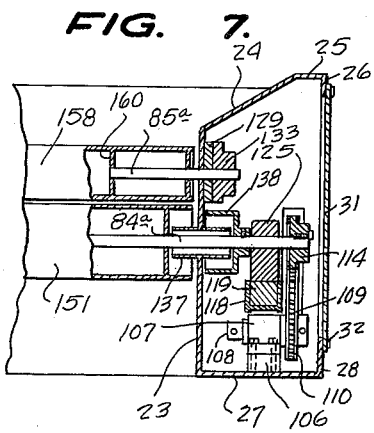
Figure 5:
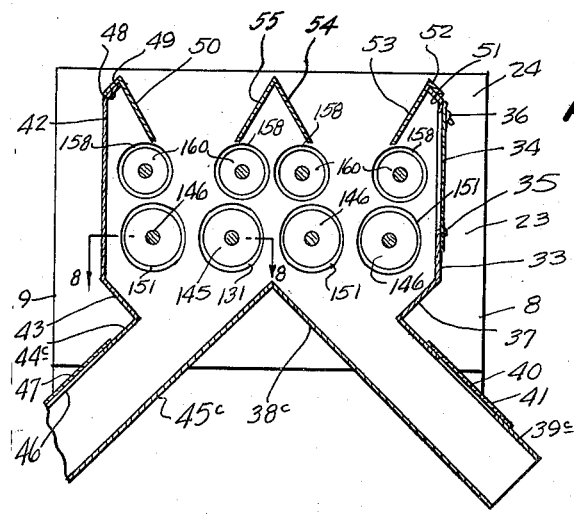

Further objects of the invention will be in part obvious and in part pointed out in the following description of the drawings, wherein:

FIG. 1 is a top view of the present sorting apparatus.
FIG. 2 is a side elevation thereof as viewed towards the lower side of FIG. 1.
FIG. 3 is a cross sectional view taken on line 3—3 of FIG. 2.
FIG. 4 is a cross sectional view taken from line 4—4 of FIG. 2.
FIG. 5 is a cross sectional view taken on line 5—5 of FIG. 2.
FIG. 6 is a partial cross sectional view taken on line 6—6 of FIG. 3.
FIG. 7 is a partial cross sectional view taken on line 7—7 of FIG. 4.
FIG. 8 is a partial longitudinal section taken on line 8—8 of FIG. 5.
FIG. 9 is an enlarged cross sectional view taken on line 9—9 of FIG. 8.
FIG. 10 is an enlarged detailed view of the operating control for one of the slides.

Referring now more particularly to the accompanying drawings, wherein like and corresponding parts are designated by similar reference characters, numeral 1 indicates the legs of a table including a top 2 and connecting braces 3.

Mounted upon top 2 above legs 1 are a pair of legs 4, while at the opposite end of said table there are mounted a pair of legs 5. Top 2 is arranged for being positioned substantially horizontal by the legs 1, while legs 4 are longer than the legs 5. The legs 4 and 5 at one side of top 2 together with their braces 6 and 7 respectively are connected to and support an elongated U-shaped side 8, while the opposite legs 4 and 5 and their corresponding braces 6 and 7 are connected to and support a similar elongated U-shaped side 9. The longer legs 4 position one end of the sides 8 and 9 on an incline to the horizontal with their uppermost end providing the receiving station of the apparatus.

Side 8 provides uprights 10 and 11 at opposite ends thereof. Side 9 has an upright 13 diametrically opposite to upright 11 connected by a plate 14 extending laterally therebetween with a top 15 extending at substantially right angles to said plate and a flange 16 extending substantially at right angles to said top. A bottom 17 also extends substantially at right angles and is connected to plate 14 and has a lateral flange 18. Side 11 has a lateral flange 19 connecting flanges 16 and 18, while upright 13 has a lateral flange likewise connecting flanges 16 and 18. A cover plate 21 is capable of extending across and closing said flanges and being connected thereto by a plurality of bolts 22 forming a housing.

At the opposite end of said sides 8 and 9 upright 10 has a plate 23 extending substantially at right angles thereto with a slanting top 24 having a bent edge portion 25, from which laterally extends a flange 26. A bottom 27 extends substantially at right angles from the lower end of a plate 23 and has a lateral flange 28. Flanges 26 and 28 are connected adjacent side 9 by a flange 29 and adjacent side 8 by a flange 30. A cover plate 31 can be mounted on and extend across said flanges covering the same and being retained thereon by bolts 32.

An elongated side 33 is connected to and extends between plates 14 and 23 longitudinally of the apparatus. This side 33 has a cover 34 connected by hinges 35 and detachable bolts 36 which can be pivoted for exposing a clean out opening in said side. Side 33 is bent inwardly at 37 and connected to a series of inwardly tapering dispersing tubes 39a, 39b and 39c. Each of these tubes has an opening 40 and a cover plate 41 therefor for clean out purposes.

A second elongated side 42 is connected to and extends between plates 14 and 23 substantially parallel and opposite to side 33. Side 42 likewise has an inwardly bent marginal portion 43 connected to a series of inwardly tapering dispersing tubes of which only tube 44c is shown in FIG. 5 as one of a series similar to, but oppositely directed from tubes 39a, 39b and 39c. The inner sides of both series of tubes meet and are connected together for example 38c and 45c shown in FIG. 5 forming an apex between the innermost rollers as hereinafter described. Each of the tubes in the series with tube 45c having a clean out opening covered by a detachable plate 47. Side 42 has an inwardly bent upper marginal edge portion 48 upon which is mounted the base 49 of a guide plate 50. Similarly the upper marginal edge 51 of side 33 is bent inwardly and has mounted thereon base 52 of a second guide plate 53. A V-shaped elongated guide plate having sides 54 and 55 is connected to plates 14 and 23 and extend substantially parallel to sides 33 and 42 being equally spaced therebetween.

Upon the inner face of plate 14, there is fixedly mounted a channel member 56 extending laterally of the apparatus and having a bar 57 slidably mounted therein. Said bar has an upright 58 with a screw 59 in threaded engagement therethrough and which screw extends through upright 11 and is rotatably supported thereby against longitudinal movement. A hand wheel 60 is provided for rotating said screw. A pair of blocks 61 and 62 are fixedly mounted on bar 57 and held thereon by bolts 63 and 64. Block 61 includes a bearing 71 having a shaft 72 rotatably extending therethrough and having a gear 73 fixedly mounted upon one end of said shaft by a screw key 74. A second gear 75 is fixedly connected by a screw key 76 to one end of shaft 77 rotatably extending through a bearing 78 fixedly mounted on plate 14 with an endless chain 79 extending around both gears 73 and 75.

Block 62 has a bearing 80 mounted thereon with gear 81 fixedly connected to one end of a shaft (not shown)

rotatably extending through said bearing. A gear 82 is connected by endless chain 83 to gear 81 and is fixedly connected upon the end of a shaft 85 rotatably extending through a bearing 84 fixedly mounted on plate 14.

A bearing 86 is also fixedly mounted on plate 14 and rotatably supports a shaft upon the end of which is fixedly connected gear 87. Above bearing 86 is fixedly mounted a second bearing 89 which supports a gear 90 connected by endless chain 91 to gear 87 and fixedly mounted upon shaft 92 extending through bearing 89.

A further bearing 93 supports a gear 94 fixedly connected upon shaft 95 extending through said bearing while a further bearing 96 is fixedly connected to plate 14 above the bearing 93 and rotatably supports gear 97 connected by an endless chain 98 to gear 94 by means of shaft 99 extending through bearing 96.

A scoop 100 is fixedly connected to gear 87 while a similar scoop 101 is fixedly connected to gear 81 for splashing oil positioned upon bottom 17 and providing lubrication for the aforementioned gears and their connected elements.

A plurality of cups 103 are each fixedly mounted on shafts 72, 95 and the shafts for gears 81 and 87 on the outside of plate 14 and each encase one of a plurality of tubes 102 providing openings through plate 14 for each shaft and thereby preventing the entrance of undesirable material. Similar tubes 104 are provided through plate 14 each for the passage of one of the shafts 77, 85, 92 and 99 and each of these shafts fixedly carries one of a plurality of cups 105 encasing one of said tubes for preventing the admittance of undesirable material therein.

Bottom 27 has a block 106 fixedly mounted thereon and supporting a bearing 107 through which rotatably extends a shaft 108 which shaft has a pulley 109 fixedly mounted on one end with an endless chain 110 connecting the same to gear 111 and gears 114, 115, 116 and 117. Gear 111 is rotatably mounted in a housing 112 connected to the upright 12 of side 9 and is operatively connected to a motor 113 mounted on said side for rotating said gear 111.

A channel member 118 is connected to and extends between uprights 10 and 12 and has a block 119 slidably positioned therein. Said block has an upright 120 with a threaded opening 121. As best shown in FIG. 10, a hand wheel 124 for rotating a screw 122 in threaded engagement with upright 120 with said hand wheel connected to said screw by a nut 123.

A bearing block 125 is fixedly mounted on slide 119 as is a bearing block 126. Shafts 84a and 72a respectively extend through said bearing blocks and have gears 114 and 116 fixedly mounted on the ends thereof.

A pair of bearing plates 127 and 128 are fixedly mounted on plate 23 while shafts 95a and 88a each having gears 115 and 117 respectively fixedly mounted upon an end thereof rotatably extend through said bearings 127 and 128.

A series of bearing plates 129, 130, 131 and 132 are fixedly mounted upon the upper portion of plate 23 while shafts 85a, 99a, 77a and 92a respectively rotatably extend through said bearings. Blocks 133, 134, 135 and 136 are each fixedly connected to the end of one of said shafts for preventing longitudinal displacement thereof.

A plurality of tubes 137 extend through plate 23 each for the passage of one of the shafts 84a, 95a, 72a and 88a. Each of these shafts fixedly carries one of a plurality of cups 138 which encases the respective shaft tube for preventing the passage of material therethrough.

Referring again to FIG. 10, a bearing 140 is fixedly mounted upon side 8 closing an opening 139 therein with a reduced portion 141 of screw 122 rotatably extending through said bearing which is fixedly connected by bolts 142 to said side. A sleeve 143 is positioned between bearing 140 and hand wheel 144 thereby preventing longitudinal movement of the screw 122. A guide 145 extends across channel member 118 for retaining bar 119 therein.

Each of the shafts 84a, 95a, 72a, 88a has a lateral annular disc 146 fixedly positioned in and extending across the bore 147 of one of a plurality of rollers 151. Said shafts further each extend through one of a plurality of circular discs 148 also fixedly mounted in and extending across bores 147.

Shafts 95, 72 and those for gears 81 and 87 also have a lateral annular disc 149 fixedly mounted to an end thereof and within and across the bores 147. The plurality of annular discs 150 fixedly mounted within each of said bores 147 also have one of said shafts extending therethrough. Discs 148 and 149 can also be fixedly connected to their respective shafts.

Each of the rollers 151 of which four are shown in the present example of the shrimp sorting machine are of an elongated configuration with a stepped periphery. That is, the upper end portion of each roller adjacent plate 23 designated by reference character 152 terminates at its circular lateral wall 153 from which extends contiguously a medial portion 154 of a smaller diameter than end portion 152. Medial portion 154 terminates in a lateral annular wall 155 from which extends contiguously the lower end portion 156 of each roller. The portions 152, 154 and 156 extend substantially parallel to the axis of the roller and their supporting shafts. Diametrically opposite sides of each portion of each roller has slightly flattened contours indicated by reference numerals 157 and 158 in FIG. 9.

The plurality of cylindrical tubular rollers 159 are positioned above said rollers 151 with each roller 158 to one side of a roller 151 as shown in FIG. 5.

Circular discs 160 are each fixedly mounted within and extend across an end portion of the bore of one of said rollers 159 with each disc also fixedly connected to one of the shafts 92, 77, 99, 85, 85a, 99a, 77a and 92a for rotatably supporting said rollers and fixedly connecting the same to their respective shafts.

The following pairs of shafts accordingly extend in line with one another and each support one of the rollers 151, namely shaft 84a and the shaft for gear 81; shafts 95 and 95a; shafts 72 and 72a and shaft 88a and the shaft for gear 87. Also the following pairs of shafts extend in line with one another and rotatably support one of the rollers 159, namely 92, 92a; 77, 77a; 99, 99a; and 85, 85a.

In the operation of the present apparatus, shrimp in any position and regardless of their size are fed into the receiving station or upper end of the apparatus. That is, onto top 24. For this purpose an endless conveyor 161 having an endless belt 163 and driven by a motor 164 can be pivotally connected at 162 to top 25. The shrimp can be dumped upon belt 163 which is shown herein only by way of an example and thus fed onto top 24 and between the guide plates 50, 55, 54, and 53 which will direct the same towards the periphery and space between each pair of rollers 160 which rollers will feed the same onto the periphery of the upper end portion 152 of each roller 151. The shrimp have a tapered body being larger at their head portion and tapering inwardly to their tail. Thus, the shrimp upon reaching the rollers 151 will drop by gravity with their tail end lowermost between each pair of said rollers 151. Those shrimp whose shoulder or head end is sufficiently narrower to fit between the flattened surfaces 158 of the opposing pairs of rollers will pass therebetween downwardly into the tubes 39c and 45c where they will pass outwardly to waiting receptacles. The remaining shrimp will slide longitudinally of the rollers due to gravity until they reach the medial portion 154 and those shrimp whose largest end will fit between the flattened surface 157 of this medial portion will drop therethrough into dispensing tubes 39b and 45b. The shrimp remaining above said rollers will slide further longitudinally thereof until they reach the lower end portion 156 and the shrimp whose largest end portion will pass between the flattened surfaces 157 of these end portions will pass downwardly to the dispensing tubes 39a and 45a. All shrimp remaining above the rollers at the end thereof will pass into the end dispensing chutes 39d and 45d.

Motor 113 through a gear 111 drives the chain 110 which passes under gear 114 over gear 115 under gear 116 and over gear 117, thus rotating shafts 84a and 72a in one direction and shafts 95a and 88a in an opposite direction. Their connected rollers 151 are rotated accordingly so that the opposing rollers rotate in an opposite direction to one another. At the lower end gears 87, 73, 94 and 81 are rotated by their connection to their respective rollers and through chains 91, 79, 98 and 83 rotate gears 90, 75, 97 and 82 which in turn rotate their rollers 159 connected thereto.

At any time that it becomes desirable to vary the distance between the opposing sides of the rollers 151, it is necessary to rotate hand wheels 60 and 124. Thus by rotating wheel 124 upright 120 is moved along screw 122 with the result that the slide 119 moves the bearings 125 and 126 relative to the bearings 127 and 128 positioned therebetween and thus moving the rollers 151 connected to shafts 84a and 72a. Similarly, rotation of wheel 60 moves upright 58 and slide 57 moving bearings 71 and 80 and thus changing the position of the rollers 151 connected thereto at their lower end.

The present apparatus is capable of considerable modification and such changes thereto as come within the scope of the appended claims is deemed to be a part of the invention.

What I claim is:

1. A machine for sorting mixed articles according to size comprising an elongated frame, means supporting said frame on an incline to the horizontal with one end providing the article receiving station being positioned above the opposite end, a pair of upright plates fixedly mounted laterally of and on opposite ends of said frame, a plurality of similar elongated rollers having stepped peripheral surfaces, a plurality of shafts each connected to an end of one of said rollers, a plurality of bearings fixedly mounted in a series on one of said plates laterally of said frame, a second plurality of bearings fixedly mounted in a series on the other of said plates laterally of said frame and each in line with one of said bearings on the first mentioned plate, a pair of channel members each connected to said frame and extending laterally thereof adjacent a different one of said plates, a pair of slides each positioned in one of said channel members for sliding therein, a plurality of bearings carried by one of said slides and each positioned between a pair of said fixed bearings on one of said plates, a second plurality of bearings carried by the other of said slides and each positioned between a pair of said fixed bearings on the other of said plates and in line with a bearing on the first mentioned slide, each of said roller shafts being rotatably mounted in one of said bearings positioning said rollers extending longitudinally of said frame, means for moving said slides varying the spacing between bearings thereon and bearings on said plates whereby the spacing between said rollers is adjusted according to the size of articles desired to pass therethrough and means for rotating said rollers for moving the articles thereon.

2. A machine for sorting mixed articles according to size, as claimed in claim 1, wherein a series of bearings are fixedly mounted on one of said plates above the first-mentioned series of bearings thereon, a second series of bearings are fixedly mounted on the other of said plates above the first-mentioned series of bearings thereon and in line with the upper bearings on said first-mentioned plate, a plurality of shafts each rotatably extend through one of said upper bearings, a plurality of elongated rollers each connected at its ends to a pair of said shafts being positioned thereby above and in line with one of said first-mentioned rollers for feeding articles thereto, a plurality of sprocket wheels are each fixedly connected on one of said first mentioned roller shafts, a second plurality of sprocket wheels each fixedly connected to one of the shafts at one end of said upper rollers, flexible means connecting each sprocket wheel at one end of each upper roller with a corresponding sprocket wheel at one end of a lower roller and said rotating means includes a driven flexible member connecting the sprocket wheels of the opposite end of said lower rollers.

References Cited in the file of this patent

UNITED STATES PATENTS

| | | |
|---|---|---|
| 1,090,817 | Knoerzer | Mar. 17, 1914 |
| 1,927,405 | Johnson | Sept. 19, 1933 |
| 2,702,628 | Lucius et al. | Feb. 22, 1955 |